US012682480B2

(12) United States Patent　　(10) Patent No.:　　US 12,682,480 B2
Cajic　　(45) Date of Patent:　　Jul. 14, 2026

(54) OPTICAL TRACKING SYSTEM AND MARKER FOR OPTICAL TRACKING SYSTEM

(71) Applicant: Stjepan Cajic, Bosnia (BA)

(72) Inventor: Stjepan Cajic, Bosnia (BA)

(*) Notice: Subject to any disclaimer, the term of this patent is extended or adjusted under 35 U.S.C. 154(b) by 198 days.

(21) Appl. No.: 18/255,946

(22) PCT Filed: Dec. 22, 2021

(86) PCT No.: PCT/IB2021/062195
§ 371 (c)(1),
(2) Date: Jun. 5, 2023

(87) PCT Pub. No.: WO2022/137168
PCT Pub. Date: Jun. 30, 2022

(65) Prior Publication Data
US 2024/0029293 A1　　Jan. 25, 2024

(30) Foreign Application Priority Data

Dec. 24, 2020　　(EP) ..................................... 20217238

(51) Int. Cl.
*G06T 7/70*　　　　(2017.01)
*H04N 23/56*　　　(2023.01)
(52) U.S. Cl.
CPC .............. *G06T 7/70* (2017.01); *H04N 23/56* (2023.01); *G06T 2207/30204* (2013.01)
(58) Field of Classification Search
CPC .... G06T 7/74; G06T 7/80; G06T 2207/30204
See application file for complete search history.

(56) References Cited

U.S. PATENT DOCUMENTS

| | | | |
|---|---|---|---|
| 4,037,924 A | 7/1977 | May | |
| 9,813,692 B2 * | 11/2017 | Zabatani | ................. G06F 3/017 |
| 2004/0104935 A1 * | 6/2004 | Williamson | ........... G06V 10/10 |
| | | | 715/757 |
| 2008/0225115 A1 * | 9/2008 | Matsushita | .......... G01N 21/958 |
| | | | 348/129 |
| 2020/0242931 A1 | 7/2020 | Matthew | |
| 2020/0242971 A1 | 7/2020 | Wang | |

(Continued)

FOREIGN PATENT DOCUMENTS

CN　　　　206875136　　　　1/2018

OTHER PUBLICATIONS

Yusuke Nakazato, et. al., A Localization System Using Invisible Retro-reflective Markers, May 16, 2005, Proceedings of the Ninth Conference on Machine Vision Applications, pp. 140-143 (Year: 2005).*

(Continued)

*Primary Examiner* — Jayanti K Patel
*Assistant Examiner* — Christopher Kingsbury Glover
(74) *Attorney, Agent, or Firm* — Anooj Patel; Kevin Schraven; Hankin Patent Law, APC

(57) ABSTRACT

An optical tracking system comprising a main camera, an optical tracking camera, a light source, and one or more markers that are configured to engage an LED wall without impeding the light generated by the LED wall so that the optical tracking camera can identify its own location in three dimensional space, and by extrapolation, the location in three dimensional space of the main camera.

5 Claims, 3 Drawing Sheets

(56) References Cited

U.S. PATENT DOCUMENTS

2020/0288050 A1    9/2020   Knoll

OTHER PUBLICATIONS

Yusuke Nakazato et al A Localization SystemUsing Invisible Retro-reflective Markers, Proceedings of the Ninth Conference on Machine Vision Applications : May 16, 2005, Tsukuba Science City, Japan, The University of Tokyo, Tokyo , JP, May 16, 2005 (May 16, 2005), pp. 140-143, XP002640941, ISBN: 978-4-901122-04-7.

Yusuke Nakazato et al: "A Localization System Using Invisible Retroreflective Markers", Proceedings of the Ninth Conference on Machine Vision Applications: May 16-18, 2005, Tsukuba Science City, Japan, The University of Tokyo, Tokyo, JP, May 16, 2005 (May 16, 2005), pp. 140-143, XP002640941 , ISBN: 978-4-901122-04-7.

European Patent Office; Search Report, Sep. 8, 2025; Application No. 20 217 238.3-1001, Cajic, Stjepan.

* cited by examiner

OPTICAL TRACKING SYSTEM AND MARKER FOR OPTICAL TRACKING SYSTEM

CROSS-REFERENCE TO RELATED APPLICATIONS

This U.S. Non-Provisional Utility Patent application claims the benefit of and priority to PCT Application No. PCT/IB2021/062195, filed on Dec. 22, 2022, titled "Optical tracking system and marker for optical tracking system", by inventor Cajic, Stjepan, that claims priority to European Patent application 202117238, filed on Dec. 24, 2020, titled "Optical Tracking System And Marker For Optical Tracking System," by inventor Cajic, Stjepan, the contents of which are expressly incorporated herein by this reference.

DESCRIPTION

The present invention relates to an optical tracking system according to the subject-matter of the claims.

Object tracking is the activity of continuous determination of the object's position and/or orientation. Object tracking is an important task in many industries such as factory automation, autonomous robot movement, autonomous vehicles, or space exploration, for example. When the object of tracking is a camera, this allows the production of the Extended Reality (XR) effects in the footage from the tracked camera. Extended Reality is an umbrella term encompassing Augmented Reality, Virtual Reality and Mixed Reality. For the production of said effects, the actual camera footage needs to be combined with the rendered virtual graphics. The virtual graphics need to be rendered in the correct perspective so that the combination of actual camera footage and the virtual graphics appear consistent. To ensure the correct rendering of virtual graphics, the camera position and/or orientation need to be determined with great spatial and temporal precision.

Virtual Reality effects have usually been achieved mostly using, so called, green screens. These are the areas covered uniformly with a specific shade of green. Other colors can and have been used, but green is the most common. In the captured footage, the specific shade of background color can be recognized and substituted by other video content. This allows the insertion of virtual graphics as the background to the actors and objects captured in the scene. The challenge in using green screens is not only to render graphics in the correct perspective, but also to adjust the lighting so that the actual footage matches the virtual graphics. This is especially difficult when the graphics are changing over time. For example, if a light source in the virtual graphics moves while the actual real-world light source remains static, the resulting footage that combines real and virtual elements looks unnatural.

This is one of the reasons why LED walls are preferred over green screens when it comes to producing a quality virtual studio. LED walls are digital displays consisting of large numbers of individual light emitting diodes (LEDs) arranged in a grid, i.e., a LED grid.

When producing Virtual Reality effects using LED walls, there is no need to combine the actual camera footage with separately rendered virtual graphics. The virtual graphics are already in the main scene when the main camera captures it. Therefore, LED walls make for better integration of the virtual graphics with the real actors and objects than, for example, green screens.

Another challenge with green screen setups is "Chroma Keying"-a process of adding transparency to certain areas of the captured images based on the prevalence of the specific shade of green color in these areas. Additional issue with green screens is removing the "green spill"-green color on the actors caused by the light reflected from the green surface in their background. Complex image processing is required for these unwanted effects to be removed.

Using green screens, the dynamic changes of lighting in the virtual graphics, such as scenes with a thunderstorm or blinking lights, will only be noticeable in the background. Actors standing in front of this background will not experience lighting effects that correspond to the virtual graphics. Here, LED walls are also preferred. When said lighting effects are displayed on a LED wall, these effects shine actual light on the actors making the whole scene look more realistic, all without the need of any intervention to the image shot by the main camera.

Extended reality technology with LED walls was recently popularized by Lucasfilm in the hit Star Wars series "The Mandalorian" and since then it has been rapidly gaining popularity, especially during the COVID-19 pandemic, which forced the movie-industry to rethink the way the movies are made and comply with safety restrictions to reduce the amount of people on set. This new XR technology is a modern day replacement for green screen studios.

In any case, in order to enable a consistent rendering of virtual graphics when producing Virtual Reality effects using LED walls or video walls, the camera position and/or orientation need to be determined with great spatial and temporal precision.

Various methods of object tracking exist. For example, GPS can track the position of an object but it is imprecise and it doesn't work indoors. If the tracked object has wheels it is possible to use wheel odometry to estimate the object's position at any point in time. Wheel odometry is sensitive to wheel slippage, accumulates error over time and, thus, requires frequent restarts. Mechanical tracking can offer satisfactory performance but it requires the object to be attached to a mechanical support like a crane. Finally, optical tracking provides a combination of versatility and precision. Optical tracking implies the usage of an image capturing device, i.e. a camera, for the purpose of tracking the position of the object. Cameras used for optical tracking are referred to as optical tracking cameras. When optical tracking is used to track the position of a camera, the camera being tracked is referred to as the main camera.

Optical object tracking relies on visual features. A visual feature is any visually distinguishing element that can be captured by the optical tracking camera in order to be used for tracking. For example, a clear cloudless sky most likely does not contain any visual features. Conversely, an environment such as any ordinary living room usually contains many visual features, e.g. pictures on the walls, plants, furniture, etc. Visual features can be natural or artificial.

Artificial visual features, i.e., visual features that are not an integral part of the environment, but which are deliberately placeable or placed in the environment of a camera, are referred to as "markers" in the context of the present disclosure. Markers are placeable and/or placed in the environment of the optical tracking camera, such that the optical tracking camera can detect markers in images captured by the optical tracking camera.

When visual features are on the object being tracked and the optical cameras are static, this is known as outside-in tracking and is commonly used for motion capture. On the other hand, when visual features are in the environment and are static, while the optical tracking camera is attached to the tracked object, this is called inside-out tracking.

Using inside-out tracking, the visual features are positioned in the optical tracking camera's environment. Visual features that are suitable for optical tracking sometimes must have a specific appearance and/or be highly salient. As such, they might be undesirable in the main scene that is captured by the main camera. An example is a main scene that uses video walls, green screens or LED grids over large areas. Inside-out optical tracking cannot rely on the visual features that are observed on a video or LED grid because such visual features are not permanent.

Another example is a main scene consisting predominantly of uniformly colored areas such as green screen studios. In such application scenarios, it is desirable that the visual features used for optical tracking do not appear in the video shot by the main camera. This is usually achieved by pointing the optical tracking camera and the main camera in different directions. The main camera is shooting at the main scene, while the optical tracking camera is shooting some other areas that contain, among other things, suitable visual features. In this way, the main scene is not required to contain visual features suitable for the optical tracking camera.

In some situations, however, it is imperative to have the visual features suitable for optical tracking within the main scene. This can be because either the main scene encompasses a large part of the camera's environment or the camera's environment outside the main scene is unsuitable to contain visual features.

The industry has been avoiding the use of inside-out camera tracking systems which require markers to be placed in the environment comprising LED walls and LED ceilings. This is because such markers are visible when placed on the LED walls, at least inasmuch they obstruct the light coming from the individual LEDs. Therefore, the preferred choice in such situations has been outside-in camera tracking systems which do not require markers or visual features in the environment for tracking. However, with such systems, the static optical tracking cameras can also be visible in the environment, which is undesirable. A need therefore exists for a system that overcomes these drawbacks.

In light of the above, it is an object of the present invention to provide a solution to overcome the drawbacks present in the prior art, particularly when tracking the position and/or orientation of an object with an optical tracking system in a setting in which LED grids are used.

The above object is solved by an optical tracking system according to the subject-matter of the claims. Preferred embodiments of the invention are defined by the subject-matter of the dependent claims.

In particular, the problem is solved by an optical tracking system for tracking the 3D position, or the 3D position and orientation, of a movable object, preferably a main camera, that is located in the vicinity of at least one LED grid such as a LED wall and/or LED ceiling and/or LED floor, comprising:

an optical tracking camera that is attachable to the object;
a light source that is arranged in close proximity to the optical tracking camera, preferably attached to the optical tracking camera, and that is configured to emit light into the field of view of the optical axis of the optical tracking camera; and
a plurality of markers that are placeable and/or placed in the environment of the optical tracking camera, preferably on the LED grid;

wherein the markers are configured to be only visible to the optical tracking camera and not visible to the object, preferably the main camera.

An important aspect of the present invention rests on the recognition that the placement of markers in a main scene that is to be filmed by a main camera does not adversely impact the appearance of the main scene if it is ensured that the markers are only visible to the optical tracking camera but remain virtually invisible to the object to be tracked, such as a main camera. With the optical tracking system according to the present invention, optical tracking of the object or main camera is possible with the use of an inside-out camera tracking system, whilst the markers are not obtrusive in the main scene.

The visibility of the markers to the optical tracking camera is ensured by providing the light source in the vicinity of the optical tracking camera and by configuring the light source to emit light into the field of view of the optical tracking camera. The light source allows illuminating the markers to the optical tracking system, whilst the main camera is not equipped with a dedicated light source that would make the markers visible to the main camera.

In the context of the present disclosure, a LED grid is to be understood as an extended area of regularly arranged LEDs, such as a LED wall, a LED ceiling or a LED floor, for example. LED grids do not inherently possess any permanent, salient visual features, since the individual LEDs of the LED grid may be controlled to change their luminosity, brightness and/or color with time, so that a detection of spatially fixed locations on the LED grid is not possible.

According to the invention, the markers that are placeable or placed in the environment of the optical tracking camera are configured to be visible to the optical tracking camera. In the context of the present invention, a marker is considered to be visible to the optical tracking camera if its pixel position in an image captured by the optical tracking camera can be determined. Conversely, in the context of the present disclosure, a marker is understood to be not visible or invisible to the object, particularly the main camera, being tracked if its appearance in a captured image is not determinable or if it is so inconspicuous that its appearance in an image captured by the main camera is not obtrusive with regard to the visual content of the main scene to be captured by the main camera.

The actual tracking is performed by analysis of images captured by the optical tracking camera that contain visual representations of the markers visible to the optical tracking camera. For this, the optical tracking camera or a positioning system connected to the optical tracking camera analyses the images captured by the optical tracking camera, in order to detect the positions of the visual features in the captured images.

Using a digital camera as an optical tracking camera, the captured image is essentially a raster image, consisting of pixels. If a marker is captured in an image, it usually spans more than one pixel. The optical tracking system is configured to perform a delineation in the captured image between the visual feature and the rest of the environment. The optical tracking system detects the pixels in the image that contain significant contrasts in their immediate surroundings.

Based on these areas of high contrast, a brightness threshold value may be computed that represents the boundary between light and darkness. The computed threshold may then be used to identify exactly which pixels are to be considered as constituting a representation of a marker captured in the images of the optical tracking camera. Once the requested set of pixels is identified, the optical tracking system can proceed to calculate the exact position of the visual feature representation of the marker within the captured image.

Based on this information, the 3D position and/or orientation of the optical tracking camera, and, thus, the 3D position and/or orientation of the object attached to the optical tracking camera can be determined by use of a suitable, known algorithm such as a SLAM (Simultaneous Localization and Mapping) algorithm. SLAM is a well-known technique well established in the literature of optical tracking methods. With this approach, the optical tracking system builds and/or updates a map of its initially unknown surroundings whilst simultaneously keeping track of its position within the surroundings.

With this approach, the optical tracking system automatically detects visual features or markers of the surroundings that are captured by the optical tracking camera and determines and stores the 3D positions of the detected visual features or markers in a 3D model that contains information on the 3D position of the visual features. These stored 3D positions can then be used to quickly determine the location of the optical tracking camera. The 3D model may be created, for example, via the use of standard "Structure from Motion" techniques.

A seminal piece of work in this field that describes implementations of a SLAM algorithm is Andrew J. Davison's publication of 2003: "Real-Time Simultaneous Localisation and Mapping with a Single Camera" (DOI: 10.1109/ICCV.2003.1238654). Further reference may be made to H. Durrant-Whyte e.a., "Simultaneous localization and mapping: part I" (DOI: 10.1109/MRA.2006.1638022) and T. Bailey, "Simultaneous localization and mapping (SLAM): part II" (DOI: 10.1109/MRA.2006.1678144).

It is to be understood that the focus of the present invention does not lie on the computational details of the actual tracking algorithm, but on a physical configuration of an optical tracking system that allows the use of known optical based inside-out localization algorithms in environments that have been considered as inherently unsuitable for inside-out tracking due to the impossibility of providing spatially fixed visual features that would allow the use of the known inside-out localization algorithms. By providing an optical tracking system with placeable or placed markers that are only visible to the optical tracking system whilst being otherwise undetectable, the drawbacks of the prior art solutions that prevented the use of inside-out tracking methods in scenarios such as the presence of LED grids can be overcome.

According to a preferred embodiment, the light source is configured to emit light in a synchronized manner with the optical tracking camera such that the light source only emits light during the exposure time of the optical tracking camera. This further reduces the visibility of the markers to the main camera whilst ensuring a high level of visibility of the markers for the optical camera, since the markers are illuminated only during the exposure time of the optical tracking camera, resulting in a high degree of visibility during the exposure time of the optical tracking camera.

It is preferred that the optical tracking camera is equipped with a light source that is arranged in close proximity to an optical imaging system of the optical tracking camera, such that the light source is configured to emit light in the direction of the optical tracking camera's direction of looking. It may thus be ensured that the field of view of the optical tracking camera is adequately illuminated by the light source, in order to make markers visible.

It is further preferred that the light source is configured to emit light in the near infrared and/or infrared part of the optical wavelength spectrum. This is beneficial since near infrared or infrared light is barely visible or invisible to the human eye and, thus, barely visible to the main camera. Thus, illumination of the markers with near infrared or infrared light does not increase the visibility of the markers for the main camera, but only serves to increase the visibility of the markers for the optical tracking camera. In this case, it is further preferred that the optical tracking camera is configured to have a high sensitivity to near infrared and/or infrared light. This can be achieved by using a suitable image sensor such as a InGaAs or CMOS sensor for the optical tracking camera.

According to a further preferred embodiment, the light source is configured to emit light in a wavelength range that the optical tracking camera is most responsive to, preferably in a wavelength range between 450 nm and 650 nm. In this case, it is further preferred that the optical tracking camera is configured to capture images with a very short exposure time, preferably of less than 1 ms. In this case, it is further preferred that the light source is configured to emit light only during the exposure time of the optical tracking camera.

In order to further increase the visibility of the markers in comparison to other components of the main scene for the optical tracking camera, it is preferred that the optical tracking camera comprises an optical filter that is configured to attenuate or block all wavelengths of light except a band of wavelengths around the wavelength emitted by the light source.

It is further preferred that the optical tracking camera and/or the light source are configured to be synchronizable to the main camera, such that the exposure times of the optical tracking camera (and the corresponding time intervals during which the light source emits light) have a small temporal overlap with the exposure times of the main camera, or, preferably, such that the exposure times of the optical tracking camera (and the corresponding time intervals during which the light source emits light) do not temporally overlap with the exposure times of the main camera.

The optical tracking camera may be attached to the main camera and be oriented in the same direction as the main camera. An optical tracking camera using short exposure times and a sensitive image sensor, combined with a light source that is synchronized with the optical tracking camera's exposure times, can be very unobtrusive even if the light source emits its light towards the main scene.

According to a preferred embodiment, the markers have a planar shape and comprise a retroreflective area that is configured to reflect incident light in the direction of incidence. Preferably, the entire surface or a portion of more than 90% of the surface of the marker is retroreflective. This optimizes the energy usage of the light source and makes the markers less noticeable to the observers positioned differently than the optical tracking camera.

If retroreflective material is used for the markers, and a light source is used and positioned in close proximity of the optical tracking camera, the images captured by the optical tracking camera are expected to contain parts of significant contrast due to the retroreflectivity of the markers that increases their salience in the captured images due to the directed reflectance of incident light emitted by the light source of the optical tracking system. Retroreflective markers will therefore appear significantly brighter in the images captured by the optical tracking camera than the rest of the environment. The contrast can be further pronounced by the use of short exposure times of the optical tracking camera and/or the use of optical bandpass filters. The optical tracking system thus is able to associate areas of high contrast in the captured images with the representations of the visual features in the captured images.

It is further preferable that at least some of the plurality of the markers have holes and are configured to be attachable to a LED grid such that LEDs of the LED grid are located behind or in the holes of the markers. This allows for a simple placement of markers on the LED grid without interfering with the operation of the LED grid that is imperative for an unobstructed observation of the main scene.

According to a further preferred embodiment, the markers have a plurality of holes, wherein the size of the holes and the distance between the holes corresponds to the size and distance of the LEDs on the LED wall. This ensures the possibility of attaching the markers to the wall in cases in which the density of LEDs on the LED wall is high. In such cases, markers surrounding only one LED may be too small to be recognizable by the optical tracking camera, so that markers with multiple holes that span a plurality of LEDs may be preferable.

Surprisingly, it has been found that such markers are practically invisible to the main camera, while being very noticeable to the optical tracking camera with a corresponding light source. This is because the main camera is capturing the image dominantly defined by the light of the LED grid, while the glare created by the individual LEDs of the LED grid in the lens of the main camera is filling in the space between the LEDs. By using pierced markers, i.e. markers comprising holes, it is possible to provide sufficiently large markers to be visible from the distance by the optical tracking camera, but still completely invisible to the main camera.

The holes in the markers may be produced by piercing the markers, or by carving out the holes in the markers. Preferably, the production of the holes in the markers is carried out in a manner such that the light from the LED positioned in the hole can still be emitted in wide angles, i.e. not just orthogonally from the surface of the LED grid.

According to a further preferred embodiment the markers have characteristic shapes, such as a rectangular, square, round, elliptic, polygonal or star shape. The use of characteristic shapes for individual markers allows for an efficient identification of the markers. In this context, it is preferred if the plurality of markers comprise different, differentiable characteristic shapes, in order to facilitate the distinction between different markers.

It is further preferred that the markers have a specific color, preferably a color matching a background color of the LED grid. This further reduces the visibility of the markers for the main camera. Especially when used in combination with a LED grid, it is preferable to match the color of the markers with the background color of the LED grid. This makes the markers even less conspicuous to the main camera, while retaining their visibility to the optical tracking camera, in particular if the surface of the markers comprises retroreflective areas.

The object of the invention is further solved by a marker for use in an optical tracking system according to any of the preceding claims, having a planar shape and comprising a retroreflective area that is configured to reflect incident light in the direction of incidence.

Such markers are particularly suitable for use in an optical tracking system for tracking the 3D position and/or orientation of an object positioned in the vicinity of a LED grid.

Such markers, when used with an inventive optical tracking system as described above, are simultaneously visible to the optical tracking camera whilst being virtually invisible to the object to be tracked, such as a main camera.

The technical advantages achieved with the markers of the present invention correspond to those achieved with the optical tracking system described above. Aspects, features and advantages described in the context of the inventive optical tracking system are also applicable to the inventive marker, and vice versa.

Preferably, the marker comprises one or more holes and is configured to be attachable to a LED grid such that LEDs of the LED grid are located behind or in the holes of the marker. This allows a placement of the marker on a LED grid such that the light from the LEDs of the LED grid that are covered by the marker can still pass through the marker. This makes the markers blend in seamlessly with the LED grid, making minimum impact on the visual appearance of the LED grid.

The holes may extend through the entire marker. Alternatively, the marker may comprise multiple layers, preferably containing a retroreflective layer and one or more transparent layers. In this case, the holes may not extend through all layers of the marker but only through the non-transparent layers of the marker such as the retroreflective layer. The holes are arranged such that LEDs of the LED grid are placeable behind the holes in order to allow the LEDs to emit light through the holes in the one or more non-transparent layers and through the transparent layers.

Insofar, it may be preferable that the marker comprises multiple layers, comprising transparent and non-transparent layers, wherein the non-transparent layers have holes and are configured and arranged such that the marker is attachable to a LED grid such that LEDs of the LED grid are located behind the holes of the markers.

It is further preferred that the marker has a characteristic shape, such as a rectangular, square, round, elliptic, polygonal or star shape. As stated above, characteristic shapes allow for an efficient identification of the markers.

Further preferably, the marker has a specific color, preferably a color matching a background color of the LED grid. This allows for a better visual integration of the marker into the background of the main scene.

The present invention further pertains to the use of a marker or a plurality of markers as described above in an optical tracking system, particularly an optical tracking system as described above.

The technical advantages achievable with the optical tracking system and the markers of the present invention correspond to those achieved with the use of the markers in an optical tracking system described above. Aspects, features and advantages described in the context of the inventive optical tracking system and the inventive markers are also applicable to the inventive use of the marker, and vice versa.

The above and further features and advantages of the present invention will become more readily apparent from the following detailed description of preferred embodiments of the invention with reference to the accompanying drawings, in which.

Figure 1:
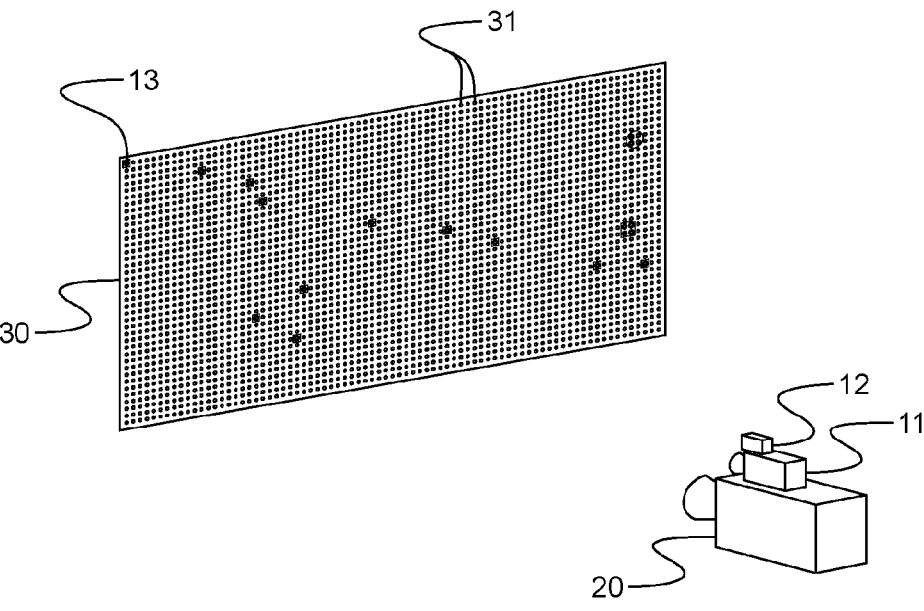
FIG. 1 is a schematic illustration of an optical tracking system according to an embodiment of the present invention that enables the tracking of a main camera in an environment containing a LED wall.

FIG. 1 is a schematic illustration of an optical tracking system according to an embodiment of the present invention for tracking the 3D position and/or orientation of an object such as a main camera. The optical tracking system comprises an optical tracking camera 11 and a light source 12 that is attached to the optical tracking camera 11. The optical tracking camera 11 is attached to a main camera 20 whose 3D position and/or orientation is to be tracked. The optical tracking camera 11 is attached to the main camera 20. The optical tracking camera 11 is oriented to face in essentially the same direction as the main camera 20.

Both the main camera 20 and the optical tracking camera 11 are directed towards a LED wall 30 that comprises a large number of LEDs 31 arranged in a grid. In the exemplary embodiments depicted in FIG. 1 and described below, the LED wall 30 is an exemplary representation of a LED grid. It is to be understood that the LED grid may be constituted by a LED wall, a LED ceiling, a LED floor, any combination of the former or another arrangement of a grid of LEDs 31 of considerable spatial extent that constitutes a major part of a main scene to be observed or filmed by a trackable object such as the main camera 20.

The optical tracking system is configured to track the 3D position and/or orientation of the main camera 20. For this, the optical tracking camera 11 captures images that are analyzed by the optical tracking system to determine the 3D position and/or orientation of the main camera 20. In order to enable this determination, the environment of the optical tracking camera 11 must contain stationary visual features that do not move over time. Such visual features serve as landmarks for the localization algorithms. In the case of a LED grid, no stationary visual features that may be utilized by the optical tracking system are readily available-color and brightness of the individual LEDs 31 may vary over time.

For this reason, the optical tracking system according to the present invention utilizes a combination of a light source 12 that is configured to emit light into the field of view of the optical tracking camera 11, and markers 13 that are placeable on the LED wall 30. FIG. 1 schematically depicts ten markers 13 on the LED wall 30. The markers 13 are configured such that they are made visible to the optical tracking camera 11 by illumination via the light source 12, whilst being hardly visible to the main camera 20.

Figure 2:
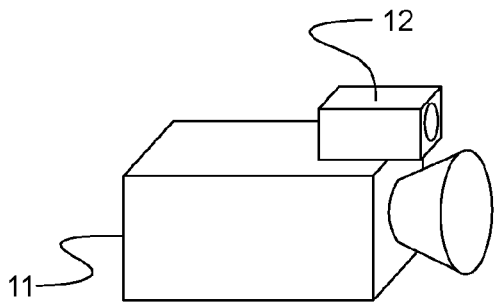
FIG. 2 is a schematic illustration of an optical tracking camera and light source for an optical tracking system according to an embodiment of the present invention.

FIG. 2 shows a schematic representation of an optical tracking camera 11 and light source 12 according to an embodiment of the present invention. In order to ensure that the light source 12 is always positioned to emit light in the field of view of the optical tracking camera 11, the light source 12 is attached to the optical tracking camera 11.

Figure 3:
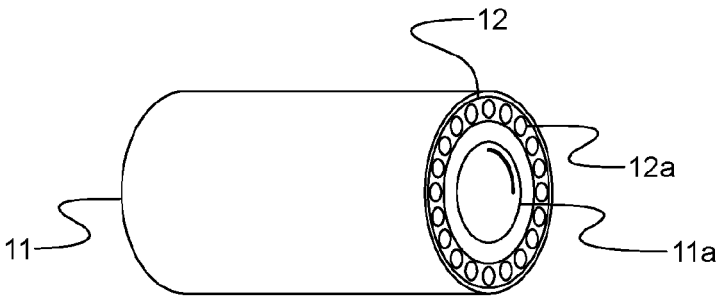
FIG. 3 is a schematic illustration of a further configuration of an optical tracking camera and light source for an optical tracking system according to an embodiment of the present invention.

FIG. 3 shows a schematic representation of an optical tracking camera 11 and light source 12 according to another embodiment of the present invention. The light source 12 is constituted by a plurality of light source units 12a, such as light-emitting diodes, that are configured as a ring light that is arranged around a lens 11a of the optical tracking camera 11. With this embodiment, it may be ensured that the light source 12 always emits light in the direction of the optical axis of the optical tracking camera 11, and, thus, into the field of view of the optical tracking camera 11.

The light source 12 may be configured to emit infrared or near infrared light. In this case, the optical tracking camera 11 is equipped with a suitable image sensor that has a sufficient sensitivity in the spectral range of the light emitted by the light source 12. Additionally, the optical tracking camera 11 may comprise one or more optical filters, preferably bandpass filters, that are configured to transmit light in the spectral range of the light source 12, and to block light of other spectral ranges. Alternatively, the light source 12 may be configured to emit light in a spectral range that the image sensor of the optical tracking camera 11 is most sensitive to.

In order to reduce the impact of the optical tracking system on the operation of the main camera 20 as much as possible, prevent overheating and save energy, it is preferable that the light source 12 does not continuously emit light. Rather, the light source 12 is configured to flash light only during brief time periods. Preferably, the light source 12 is synchronized to the optical tracking camera 11 such that the light source 12 only emits light during the exposure time of the optical tracking camera 11. This ensures that the environment is properly illuminated for the operation of the optical tracking camera 11, whilst the impact on the operation of the main camera 20 is minimized. Further preferably, the optical tracking system is synchronized to the main camera 20 such that the exposure times of the optical tracking camera 11 (and, thus, the time intervals during which the light source 12 emits light) do not substantially overlap, or do not overlap at all, with the exposure times of the main camera 20. In this case, the operation of the main camera 20 is hardly affected by the light emission of the light source 12 at all.

In order to facilitate the attachment of the markers 13 to the LED wall 30, whilst minimizing the impact of the markers 13 on the operation of the LED wall 30 and reducing their visibility to the main camera 20 as much as possible, the markers 13 preferably have a substantially planar shape. The markers 13 may be provided in the form of plate-like objects or foils. Preferably, the markers 13 are provided with a self-adhesive backside to facilitate the attachment to the LED wall 30.

In order to increase the visibility of the markers 13 to the optical tracking camera 11, it is preferable that the markers 13 comprise a retroreflective area that is configured to reflect incident light back to the direction of incidence. Preferably, the front side of the markers 13 facing away from the LED wall 30 after attachment comprises the retroreflective area. It is preferred that most of the frontside of the markers 13 is configured to be retroreflective, e.g., more than 90% of the front area of the markers 13. Retroreflectivity may be achieved by shaping the surface of the markers 13 in a cat-eye fashion, or by applying a retroreflective film to the surface of the markers 13.

Retroreflective markers 13 bear the advantage that they reflect incident light back in the direction of incidence. When used with an optical tracking system as described above, light emitted by the light source 12 is reflected back by the markers 13 in the direction of the light source 12 and, thus, in the direction of the optical tracking camera 11. Thus, the visibility of the markers 13 is greatly enhanced. This allows to reduce the exposure times of the optical tracking camera 11 and the illumination times of the light source 12. Thus, the impact of the optical tracking system on the operation of the main camera 20 may be further reduced.

The main camera 20 is not equipped with a dedicated light source, so that the markers 13 are not visible to the main camera 20. If the optical tracking system is synchronized to the main camera 20, as described above, the markers 13 are not illuminated during the exposure times of the main camera 20, so that the markers 13 remain invisible to the main camera 20.

Figure 4A:
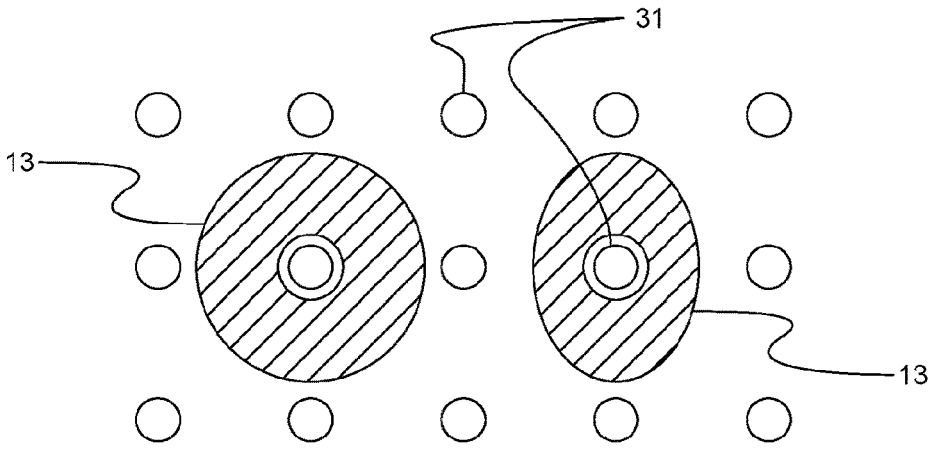
FIG. 4a-4c are schematic views of a part of a LED wall with markers according to embodiments of the present invention.
Figure 4B:
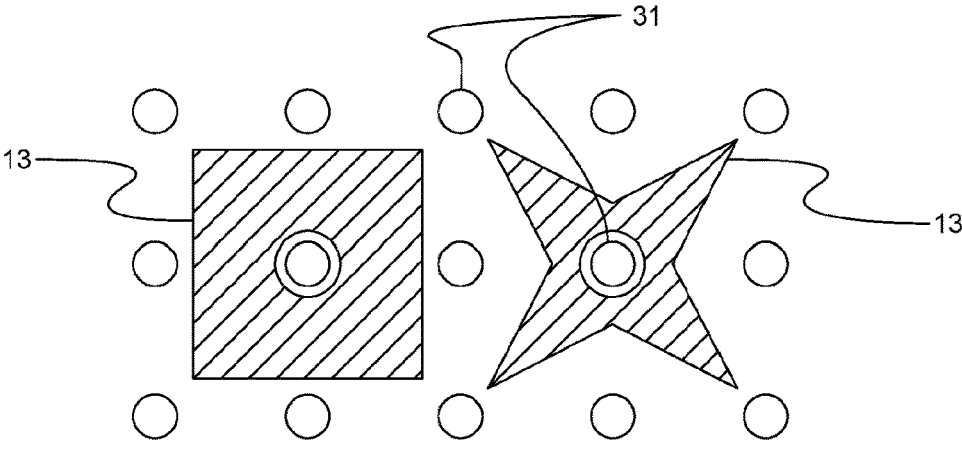
Figure 4C:
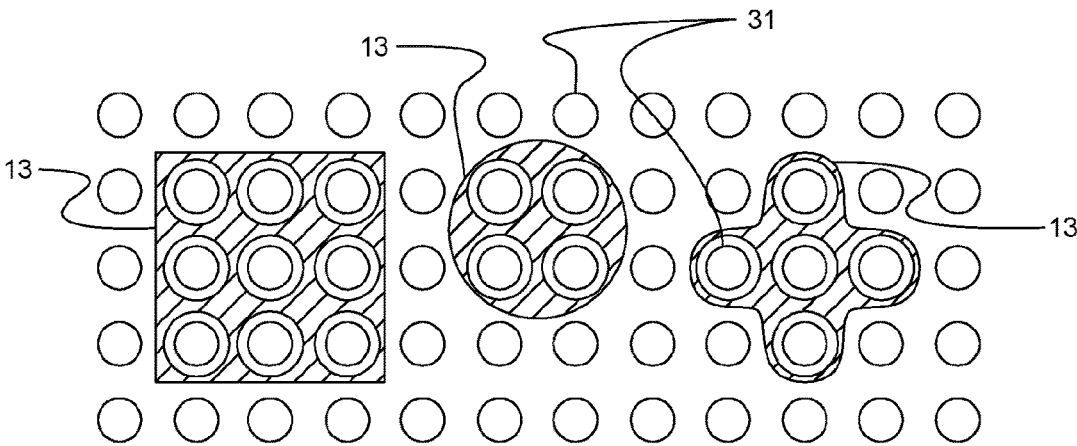

In order to facilitate the attachment of the markers to the LED wall 30, the markers 13 comprise holes that are arranged such that LEDs 31 of the LED wall 30 are located in the holes when the markers 13 are attached to the LED wall 30. This facilitates an inconspicuous arrangement of the markers 13 on the LED wall 30. FIGS. 4a to 4c schematically depict a section of a LED wall 30 with a grid of LEDs 31, on which markers 13 are placed.

The markers 13 shown in FIGS. 4a and 4b comprise only one hole that accommodates one LED 31 when the markers are attached to the LED wall 30. The markers 13 have a retroreflective surface, which is indicated by the hatching. In order to facilitate an identification of individual markers 13 for the optical tracking system, it is preferable that markers 13 with characteristic shapes are used. FIGS. 4a and 4b show different embodiments of markers 13 with characteristic sizes, i.e. circular, elliptic, rectangular and star shapes. The markers are not limited to those shapes and may also be provided with a polygonal shape or an irregular shape.

If the LED wall 30 has a high density of LEDs 31, it may not be possible to provide markers 13 of sufficient size to be recognizable by the optical tracking camera 11 with only one hole. In this case, the markers 13 comprise a plurality of holes that are configured in distance and size such that they match the distance and size of the LEDs 31 on the LED wall 30. FIG. 4c schematically depicts different embodiments of markers 13 with multiple holes that may be used on a LED wall 30 with a higher density of LEDs 31. The shapes of the markers 13 is not particularly limited, nor is the number of holes. In the examples shown in FIG. 4c, the marker 13 on the left side has a square shape with nine holes, the marker 13 in the middle has a circular shape with four holes, and the marker 13 on the right side has a cross shape with five holes.

Preferably, the color of the front surface of the markers 13 is chosen to correspond to the background color of the LED wall 30. This ensures that the markers 13 are virtually invisible when not illuminated directly.

The holes in the markers 13 may be created by piercing, if the markers 13 are sufficiently thin. Alternatively, the holes may be carved out of the markers 13 if the markers are made of a solid material such as a plastic material and have a sufficient thickness. The configuration of the holes should be adapted to the thickness of the markers and the configuration of the LEDs 31 on the LED wall 30, as schematically shown in FIGS. 5a to 5c.

Figure 5A:
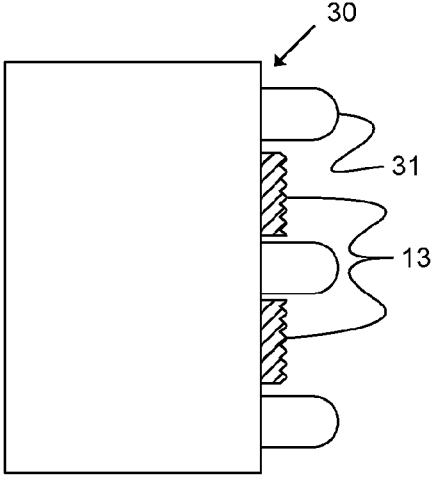
FIG. 5a-5d are schematic side views of a section of a LED wall with an attached marker according to an embodiment of the present invention.

FIG. 5a schematically depicts a small part of a LED wall 30 in cross-section with three LEDs 31 and a marker 13 attached to the LED wall 30. The LEDs 31 in FIG. 5a have a large spatial extent and protrude substantially from the LED wall 30. The marker 13 is very thin so that the marker 13 is substantially placed behind the LEDs 31 after attachment. With this configuration, the marker 13 does not affect the operation of the LEDs 31, particularly the LED 31 located in the hole of the marker 31. In this case, the hole of the marker 13 may be provided by stamping or piercing the marker 13. As in the previous descriptions, retroreflective material is indicated by hatched areas.

Figure 5B:
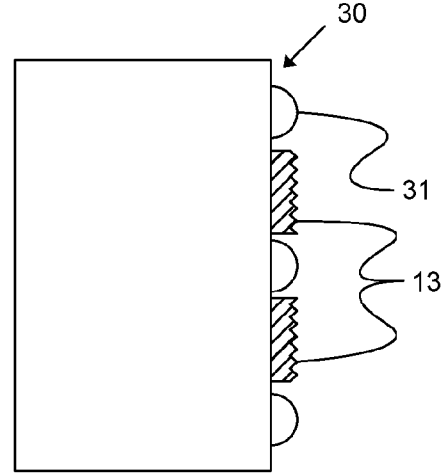

FIG. 5b schematically depicts another configuration of a LED wall 30 in which the LEDs 31 do not substantially protrude from the LED wall 30 but are formed close to the surface of the LED wall 30. The marker 13 in FIG. 5b is again very thin. The surface of the marker 13 is at the same distance from the LED wall 30 as the tips of the LEDs 31, so that the presence of the marker 13 does not substantially obstruct the light emission of the LEDs 31 in the vicinity of the marker.

Figure 5C:
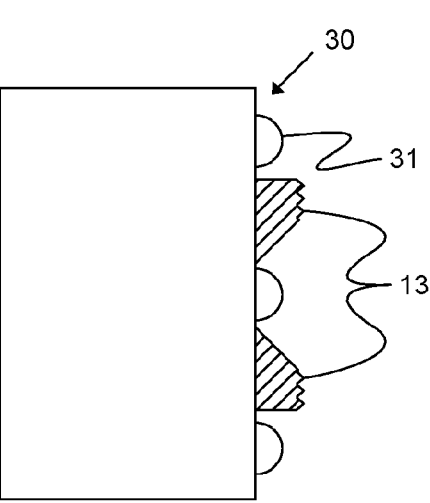

FIG. 5c shows a configuration in which a thick marker 13 is used on a LED wall 30 with LEDs 31 that do not substantially protrude from the surface of the LED wall 30. In this case, it is not expedient to produce holes in the markers 13 by piercing or stamping. Rather, the holes in the markers 13 should be carved out, such that the diameter of the hole increases in the thickness direction of the marker 13. On the backside of the marker 13, the diameter of the hole corresponds to the diameter of the LEDs 31 on the LED wall 30, so that the marker 13 can be placed on the LED wall 30 with a LED 31 being located in the hole. Towards the front surface of the marker 13, the diameter of the hole increases so that the marker 13 does not obstruct the LED 31 located in the hole of the marker.

Figure 5D:
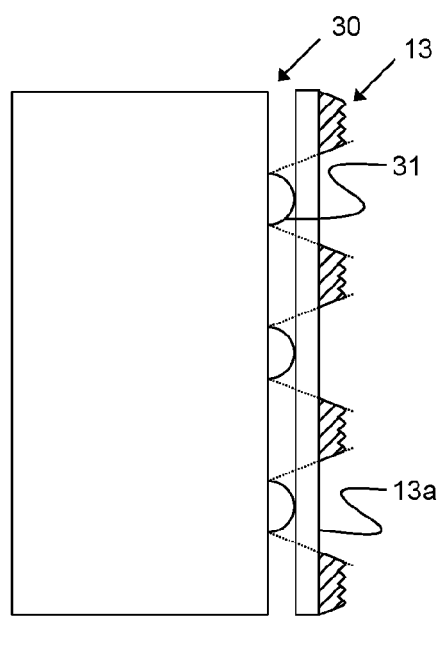

In FIGS. 5a to 5c, markers were shown that comprise essentially one non-transparent, retroreflective layer. Markers can also comprise multiple layers, including transparent layers. FIG. 5d shows a marker 13 comprising a retroreflective layer (indicated by hatched areas) with holes and a transparent layer 13a. The holes only extend through the non-transparent layer of the marker 13. The transparent layer 13a does not contain holes. The marker 13 is configured such that the holes in the non-transparent layers have a size and distance that allows for a placement of the marker 13 such that LEDs 31 are located behind the holes in the non-transparent layer. The LEDs can emit light through the transparent layer 13a and the holes in the non-transparent layer in a wide angle, as indicated by dashed lines. This configuration of the marker 13 allows for a simple placement of the marker 13 on the LED wall 30, since the marker 13 can be placed directly on the LEDs 31 without obstructing the light emission of the LEDs 31 that are located behind the holes in the non-transparent layer of the marker 13.

The material from which the markers 13 are manufactured is not particularly limited. If the markers 13 are configured with a cat-eye surface, it may be preferable to manufacture the markers 13 from a synthetic or polymer material. Markers 13 may also be provided in the form of a foil or film with a retroreflective material on one surface and a self-adhesive coating on the other surface.

LIST OF REFERENCE SIGNS 11 optical tracking camera
11a lens
12 light source
12a light source unit
13 marker
13a transparent layer
20 main camera
30 LED wall
31 LED

The invention claimed is:

1. An optical tracking system, comprising:
a main camera;
an optical tracking camera;
a light source;
one or more markers;
wherein said optical tracking camera is fixed relative to said main camera;

wherein said light source is configured to emit light into the field of view of the optical tracking camera;

wherein said one or more markers are visible to said optical tracking camera;

wherein said one or more markers are not visible to said main camera;

wherein said one or more markers comprise a retroreflective surface;

wherein said one or more markers comprise one or more holes; and wherein said markers are configured to be affixed to an LED wall such that said one or more holes are configured to allow light generated from said LED wall to pass through said one or more holes of said one or more markers without interference.

2. The optical tracking system of claim 1, wherein the optical tracking camera comprises an optical filter that is configured to attenuate or block all wavelengths of light except a band of wavelengths around a wavelength emitted by the light source.

3. The optical tracking system of claim 1, wherein the optical tracking system is synchronized to the main camera such that the exposure times of the optical tracking camera and the main camera do not substantially overlap.

4. The optical tracking system of claim 1, wherein said one or more markers comprise a first marker and a second marker;

wherein said first marker and said second marker engage different parts of said LED wall.

5. The optical tracking system of claim 1, where each of said one or more holes of said one or more markers is sized and positioned on said LED wall to allow one LED of said LED wall to pass through each of said one or more holes.

\* \* \* \* \*